Figure 4:
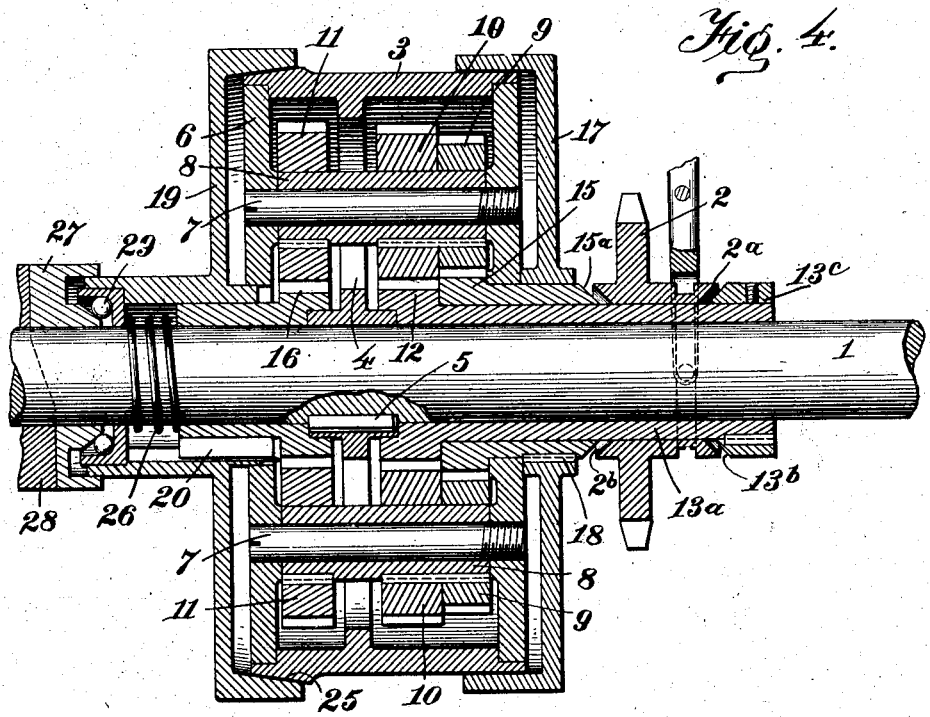

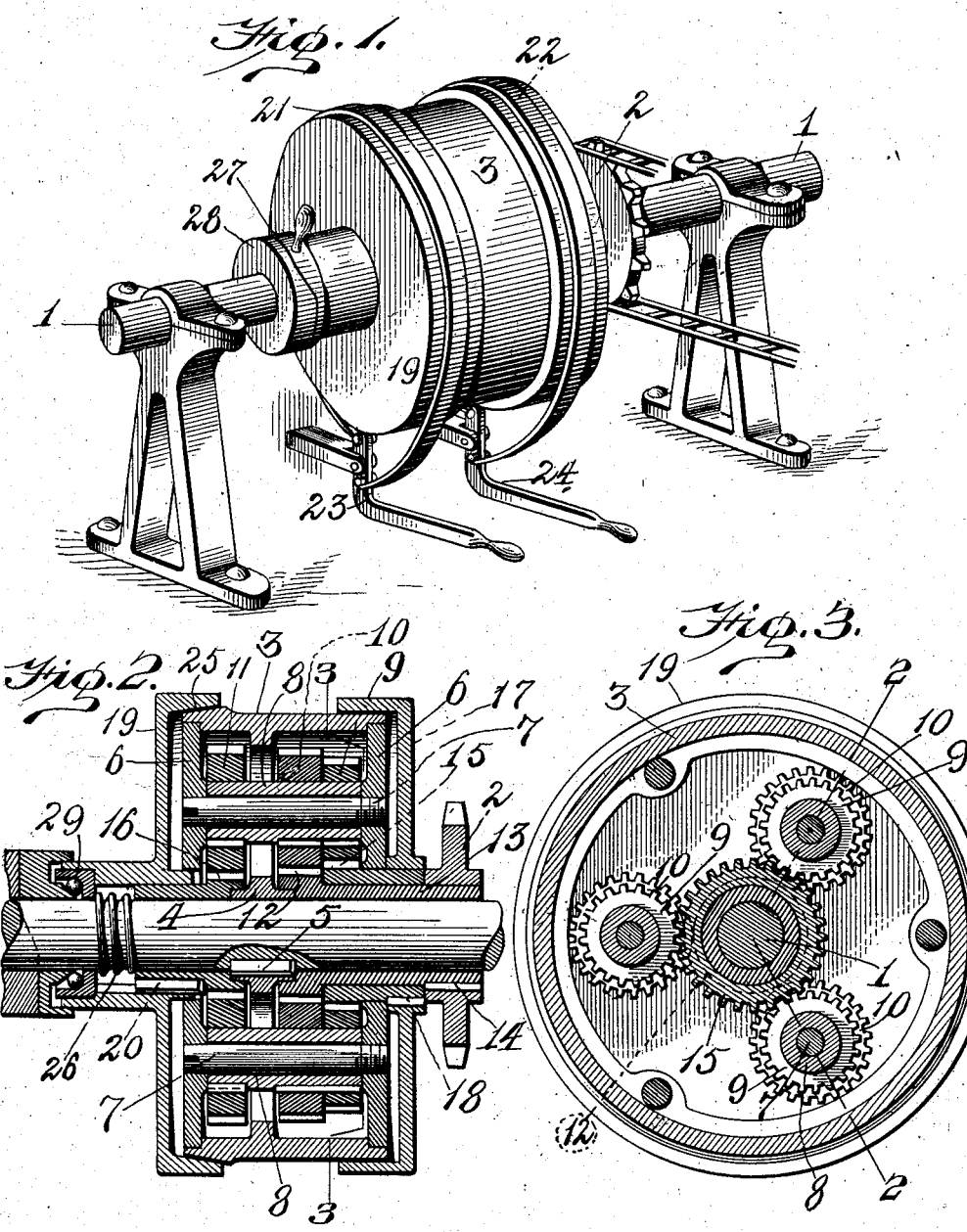

No. 833,802. PATENTED OCT. 23, 1906.
J. REDDING.
REVERSING AND SPEED CHANGING TRANSMISSION GEAR.
APPLICATION FILED MAY 20, 1905.

2 SHEETS—SHEET 2.

Witnesses:

Inventor
Jacob Redding
By
Knight Bros
Attorneys

UNITED STATES PATENT OFFICE.

JACOB REDDING, OF ANDERSON, INDIANA, ASSIGNOR TO J. W. DAVIS, OF ANDERSON, INDIANA.

REVERSING AND SPEED-CHANGING TRANSMISSION-GEAR.

No. 833,802.  Specification of Letters Patent.  Patented Oct. 23, 1906.

Application filed May 20, 1905. Serial No. 261,372.

*To all whom it may concern:*

Be it known that I, JACOB REDDING, a citizen of the United States, and a resident of Anderson, in the county of Madison and State of Indiana, have invented a new and useful Reversing and Speed-Changing Transmission-Gear, of which the following is a specification.

The subject of the present invention is a gear through which motion may be transmitted from a driving member to a driven member to cause the latter to travel a number of speeds in the forward direction and also in a reverse direction without changing the direction of rotation of the driving member.

In my Letters Patent No. 526,199, granted September 18, 1894, I disclose means for locking a driven member to a driving member directly in such a manner as to transmit motion in a like direction and at the same speed, this means being also constructed when released to throw in a planetary gear which would change the motion of the driven member to a greater speed than that of the driving member. A device having similar objects in view is disclosed in my Letters Patent No. 572,828 of December 8, 1896. Neither of these constructions, however, provides an additional set of pinions or gear-wheels by which to secure a reverse motion, although a reverse motion can be obtained by removing and rearranging the pinions shown, nor is it possible to secure a forward movement at a reduced speed.

In the present invention I employ a construction by which may be obtained in the driven member not only a speed the same as the driving member, but one or more forward speeds slower than the driving member and also a reverse motion.

Other and further objects will appear in the following description and will be more particularly pointed out in the claims.

In the drawings, Figure 1 is a perspective view of one embodiment of my invention. Fig. 2 is a section on the line 2 2, Fig. 3. Fig. 3 is a section on the line 3 3, Fig. 2; and Fig. 4 is a section similar to Fig. 2, showing another embodiment of my invention.

Referring more particularly to the drawings, 1 indicates a driving member or shaft. A casing or mounting 3, having a radial web and hub 4, is keyed at 5 to the shaft to turn therewith and is provided with heads 6, in which are fixed axles 7 of tubular converting-shafts 8. These shafts are held in position exterior to the shaft 1 with freedom of rotation about their own axes and are at all times compelled when the driving-shaft is rotated to revolve about and at the same speed as said shaft. Each converting-shaft has rigidly keyed upon it a plurality of pinions 9, 10, and 11, which mesh with a like number of pinions 12, 15, and 16, loosely journaled about the driving-shaft 1, so that their axes are the same and correspond with the axis of the driving-shaft. The pinions on each converting-shaft 8 are of different sizes, as are the loosely-journaled pinions on the driving-shaft 1. The smallest pinion 16 on the driving-shaft meshes with the largest pinions 11 on the converting-shaft. The largest pinion 15 on the driving-shaft meshes with the smallest pinions 9 on the converting-shaft, and the intermediately-sized pinion 12 on the driving-shaft meshes with the like pinions 10 on the converting-shaft, the pinion 10 being smaller than the pinion 12.

In the embodiment shown in Fig. 2 the pinion 12 has keyed to its sleeve 13 at 14 the driven member 2 in the form of a sprocket-wheel, while the pinion 15 surrounds and turns on the sleeve 13 and has keyed to it at 18 a brake-disk 17. The pinion 16 has a brake-disk 19 keyed to it, the key 20 permitting the disk to move laterally into and out of engagement with coöperating braking-surfaces 25 on the casing 6 and the disk, the disk being normally held away from the casing by a coiled spring 26 and forced against said casing by a rotatable cam 27, which coöperates with a cam 28, fixed to the shaft 1, the disk having a ball-bearing connection 29 with said clutch. For independently holding the pinions 16 and 15 against rotation there is provided a pair of band-brakes 21 and 22, respectively, coöperating with brake disks or members 19 and 17 and controlled through levers 23 and 24.

In the embodiment shown in Fig. 4 the parts are the same as in Fig. 2, except that the driven member 2 is adapted to receive power from the pinion 12 or the pinion 15. For this purpose the sleeve 13ª, corresponding to the sleeve 13 in Fig. 2, is preferably extended and provided with an enlargement 13ᶜ, having a beveled clutch-face 13ᵇ, while the sleeve of the pinion 15 is provided with a beveled clutch-face 15$^a$. The driven member 2 is mounted on the sleeve 13$^a$ and is adapted to be shifted, so that its beveled clutch-faces 2$^a$ and 2$^b$ may engage at will the beveled clutch-faces 13$^b$ and 15$^a$, respectively. The high speed of the driven member 2 in a forward direction is produced by forcing the band and clutch-disk 19 into engagement with the casing, thereby causing all the parts to turn as one mass. Assume that pinions 16 and 10 have twenty-eight teeth each, pinions 11 and 12 thirty-two teeth each, and pinion 15 thirty-six teeth. Now, owing to the fact that pinions 9, 10, and 11 are journaled in the mounting or casing, if one of them must revolve around a stationary pinion 15 or 16 and in the same direction in which the casing travels it follows that the pinions 9, 10, and 11 will revolve on their own axes in the same direction as that of the casing and at the same relative rate of speed proportionate to the actual number of teeth engagements necessary to enable the associate pinion to pass one around the stationary pinion on each complete revolution of the casing. Now if pinion 16 is held stationary by means of band-brake 21 there must of necessity be twenty-eight teeth engagements between it and pinion 11 in each complete revolution of the casing 6, and since pinion 11 has thirty-two teeth it will revolve through $\frac{28}{32}$ or seven-eighths of a complete revolution in passing once around stationary pinion 16. Pinions 9 and 10 will, therefore, likewise make seven-eighths of a complete revolution on their own axes during one complete revolution of the casing. Pinion 10 having twenty-eight teeth will travel through twenty-four and one-half teeth of its circumference around pinion 12 during one revolution of the casing, thereby making no provision for seven and one-half of the teeth in pinion 12. There is, therefore, but one possible way for pinion 12 to move completely around pinion 12 and that is to push, pull, shove, or carry pinion 12 in a forward direction through seven and one-half teeth of its circumference or through $\frac{15}{64}$ of a complete revolution during one revolution of the gear-case. If the driven member 2 is coupled directly to the sleeve 13, as shown in Fig. 2, or through the medium of clutch-faces 2$^a$ and 13$^b$ to sleeve 13$^a$, there will be produced in the driven member a slower speed in the forward direction than the driving-shaft. Pinion 9 when the pinion 16 is held stationary will permit of twenty-one teeth escapements in engagement with pinion 15, leaving fifteen of the thirty-six teeth not functionally engaged. Hence pinion 15 will be moved forward through $\frac{15}{36}$ of a revolution during one complete revolution of the gear-case. In Fig. 2, 9 and 15 are idlers when 16 is stationary; but in Fig. 4 if the driven member 2 is shifted so that clutch-faces 2$^b$ and 15$^a$ engage one another there will be produced in the driven member a speed slower than the driving member and greater than that obtained from pinion 12, and the pinions 10 and 12 will run as idlers. When 15 is held stationary by the band-brake 22 and the band-brake 21 is released from disk 19, pinion 9 is compelled to execute thirty-six teeth engagements during one complete revolution of the casing, and consequently it travels through $\frac{36}{24}$ or one and one-half revolutions on its own axis while passing once around pinion 15. Pinion 10 must travel at the same rate of speed, and hence it effects forty-two teeth engagements in one complete revolution of the casing. Since there are only thirty-two teeth on pinion 12, said pinion must necessarily travel in a reverse direction proportionate to the difference in the number of its own teeth and that of the teeth engagements, which is $\frac{10}{32}$ or five-sixteenths of a complete revolution backward. In Fig. 2 the driven member being permanently connected to the pinion 12 partakes of the reverse or backward motion; but in Fig. 4 it is necessary to shift driven member 2 so that faces 2$^a$ and 13$^b$ are in engagement.

The embodiments herein shown within the scope of the appended claims may be changed in various ways without departing from the spirit or sacrificing any of the advantages of my invention.

Having thus described my invention, what I claim is—

1. The combination with a driving-shaft, of a converting-shaft revoluble about the driving-shaft at the same speed therewith and rotatable about its own axis, a plurality of pinions carried by the converting-shaft and rotating with said shaft, a plurality of pinions loosely journaled around the driving-shaft and each meshing with one of the pinions on the converting-shaft, a pinion held against rotation and meshing with one of the pinions on the converting-shaft, and a driven member adapted to be connected with any one of the above-mentioned loosely-journaled pinions.

2. The combination with a driving-shaft, of a converting-shaft revoluble about the driving-shaft at the same speed therewith and rotatable about its own axis, a plurality of pinions carried by the converting-shaft and rotating with the same, a plurality of pinions loosely journaled around the driving-shaft and each meshing with one of the pinions on the converting-shaft, means for independently holding a plurality of said loosely-journaled pinions against rotation, and a driven member adapted to be connected to a plurality of the latter pinions to receive rotation therefrom.

3. The combination with the driving-shaft, of a casing surrounding the driving-shaft, a converting-shaft journaled in the casing and revolving about the driving-shaft, a plurality of pinions carried by and turning with the converting-shaft, a plurality of pinions loosely journaled about the drive-shaft and meshing with the converting-shaft pinions, a brake-disk carried by one of the loosely-journaled pinions, and movable into engagement with the casing to cause the casing and the brake-disk to turn together, and a band-brake adapted to contact with the said disk to hold it against rotation.

4. The combination with the driving-shaft, of a casing surrounding the driving-shaft, a converting-shaft journaled in the casing and revolving about the driving-shaft, a plurality of pinions carried by and turning with the converting-shaft, a plurality of pinions loosely journaled about the drive-shaft and meshing with the converting-shaft pinions, brake-disks carried by a plurality of said pinions, one of said disks being movable into engagement with the casing to cause the casing to turn therewith, and band-brakes adapted to engage said disks.

5. In a transmission-gear, the combination of the driving-shaft, the drum mounted thereon, the loose pinions and the driven member also mounted on said shaft, the latter receiving motion from one of the pinions, independent brake-disks for some of the loose pinions, and a converting-shaft mounted in the drum and geared to the loose pinions, one of said brake-disks being constructed to move axially and engage the drum.

The foregoing specification signed at Anderson, Indiana, this 29th day of April, 1905.

JACOB REDDING.

In presence of—
J. W. DAVIS,
JOHN R. SHOMLEY, Jr.